United States Patent [19]

Marsh

[11] 4,420,450

[45] Dec. 13, 1983

[54] MANUFACTURE OF SPRINGS OF FIBRE REINFORCED COMPOSITE MATERIAL

[75] Inventor: Barry J. Marsh, Penkridge, England

[73] Assignee: GKN Technology Limited, Wolverhampton, England

[21] Appl. No.: 358,594

[22] Filed: Mar. 16, 1982

[30] Foreign Application Priority Data

Mar. 21, 1981 [GB] United Kingdom ............... 8108916

[51] Int. Cl.³ .......................................... B28B 11/12
[52] U.S. Cl. ................................... 264/118; 264/157; 264/263
[58] Field of Search ...................... 264/118, 157, 263

[56] References Cited

U.S. PATENT DOCUMENTS

| | | | |
|---|---|---|---|
| 2,260,453 | 10/1941 | Hartman | 264/118 |
| 3,900,357 | 8/1975 | Huchett et al. | 264/157 |
| 4,312,686 | 1/1982 | Smith et al. | 264/118 |
| 4,351,788 | 9/1982 | Schreurs | 264/157 |

*Primary Examiner*—James R. Hall
*Attorney, Agent, or Firm*—Merriam, Marshall & Bicknell

[57] ABSTRACT

A method of making leaf springs from fibre reinforced resin composite material, wherein a resin impregnated fibre assembly of a number of individual springs adjacent one another is moulded and treated to cure the resin and then cut into individual springs. The assembly is formed with depressions in the surface thereof along the lines where it is to be cut so the surface fibres remain undisplaced by the moulding process and hence undisturbed by cutting. The invention also provides a mould for treatment of the assembly of resin impregnated fibres including elements which form the surface depressions therein.

6 Claims, 4 Drawing Figures

MANUFACTURE OF SPRINGS OF FIBRE REINFORCED COMPOSITE MATERIAL

BACKGROUND TO THE INVENTION

1. Field of the Invention

This invention relates to the manufacture of leaf springs of a fibre reinforced composite material. More particularly, the invention relates to the stage of manufacture of such springs in which an assembly of resin impregnated fibres of appropriate types and dispositions is placed in a mould and subjected to treatment, such as the application of heat and pressure, to cure the resin and form the finished or near finished spring.

2. Description of Prior Art

It has been disclosed, in U.S. Pat. No. 3,900,357, that composite springs can be manufactured in the form of a plurality of individual springs alongside one another in a single assembly of resin impregnated fibres. The assembly is cut to form individual springs after the resin has been cured. The spring structure disclosed in that patent is one in which the surface layers of the spring are of cross-ply material, i.e. in which the fibres extend at an angle to the longitudinal axis of the individual springs.

SUMMARY OF THE INVENTION

The present invention relates primarily to springs in which the arrangement of fibres includes skin layers of longitudinally oriented fibres, spaced apart from one another about the neutral bending axis of the spring by a layer of fibres which are not so oriented, eg. random fibres. Such a spring will typically be manufactured by assembling successive layers of resin impregnated material, firstly, with parallel longitudinal fibres, then random fibres, and then parallel fibres again, which assembly is placed in a mould for pressing and curing. During application of pressure in the mould, fibres near the surface of the spring tend to become displaced laterally so that they are no longer parallel to the axis of the spring. The cutting of the individual springs from the assembly then severs the fibres thereof adjacent the cut, and, at least as far as fibres near the surface of the spring are concerned, this can provide a starting point for ultimate failure of the spring. The problem is of more significance for fibres near the surface of the spring because such fibres are under greater stress than the other fibres of the spring when it is in use.

The present invention provides a method of manufacturing a spring from a fibre reinforced resin composite material including forming a resin impregnated fibre assembly of a number of individual springs adjacent one another, subjecting the assembly to a moulding process including treatment to cure the resin, and cutting the cured assembly into individual springs, characterised in that the assembly is formed in the moulding process with a depression or depressions extending into the surface thereof along the lines or lines where the assembly is to be cut.

The result of this is that the surface fibres remain undisplaced by the moulding process and hence not cut during said cutting into individual springs. When the cured assembly provided by the method according to the invention is cut into individual springs, the cuts only encounter the fibres at the bottoms of the depressions along the lines of cutting, so that the problem of severance of the surface fibres is avoided.

The cross-sectional shape of the or each of said depressions may include curved edges. When an assembly having such depressions is cut, the individual springs will then have curved edges, without the necessity of machining the individual springs after cutting. It will be appreciated, however, that in most cases the individual springs will need to be cleaned up after cutting to remove any rough edges or the like.

The cutting of the assembly into individual springs will typically be carried out by a saw, eg. a band saw or circular saw. A saw cut typically will have a thickness of some millimeters, and it is desirable that the dimensions of the depressions formed in the assembly are related to the cut thickness.

Preferably the cross-sectional shape of the or each of said depressions includes a base portion having a width substantially equal to the thickness of a cut made in the assembly. By this means, the formation of a step or like surface discontinuity, which might have an undesirable effect on the finished individual spring is avoided.

The invention also provides a mould for an assembly of resin impregnated fibres intended, subsequent to treatment in said mould, to be cut into individual leaf springs, said mould including formations which engage the surface of the assemblies to form surface depressions in said assembly along the lines where it is to be cut. Said formations may be provided by elements removable from the mould.

BRIEF DESCRIPTION OF DRAWINGS

The invention will now be described by way of example with reference to the accompanying drawings, of which.

DESCRIPTION OF PREFERRED EMBODIMENTS

Figure 1:
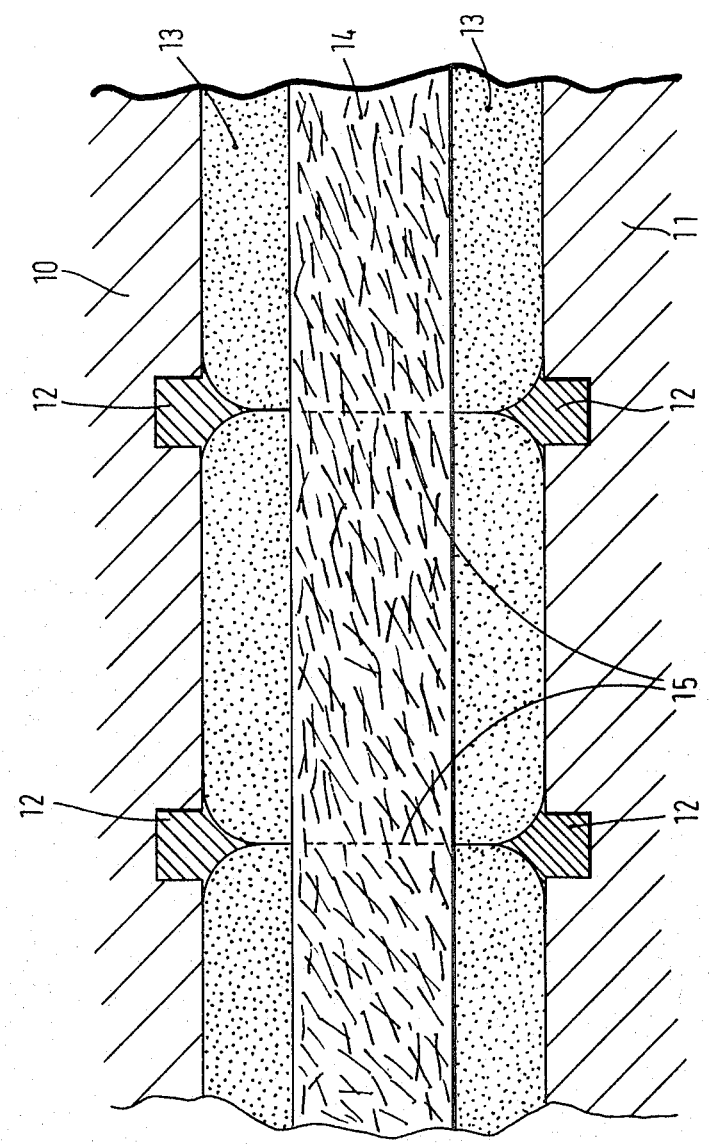
FIG. 1 is a section through a part of a mould according to the invention containing a fibre reinforced resin spring assembly.

FIG. 1 of the drawings shows part of a mould with upper and lower elements 10, 11. Between the elements of the mould is an assembly of resin impregnated fibres, with upper and lower skin layers of fibres 13 of which the majority of fibres are unidirectionally oriented, and a core layer of randomly oriented fibres 14. The direction of orientation of the fibres in layers 13 is longitudinally of the springs which are ultimately to be produced, which direction in this case is at right angles to the plane of the drawing. Typically the fibres of layers 13 would comprise or include carbon fibres, while the fibres of layer 14 would be glass fibres.

Springs would be manufactured by appropriate laying up of fibres, usually preimpregnated with resin, to form the assembly of layers 13, 14. This would then be placed in the mould where heat and pressure would be applied to cure the resin and bond all the fibres into a composite structure. Thereafter the assembly would be removed from the mould and cut longitudinally as indicated by lines 15 to form individual springs.

According to the invention, the upper and lower elements of the mould carry inserts 12 which provide the assembly of fibres with depressions along the lines where it is to be cut. The inserts 12 may be removable from the mould elements.

The inserts 12 prevent any lateral displacement of the fibres at the surface of the spring during the treatment of the spring in the mould. This keeps such fibres in alignment longitudinally of the springs.

When the curved assembly of fibres is removed from the mould and cut to form individual springs, the cuts, in effect, commence at the bottoms of the depressions formed by inserts 12 so that the fibres in layers 13 adjacent the surface of the finished springs remain untouched by such cutting. This removes a possible source of failure of the springs in service.

Figure 2:
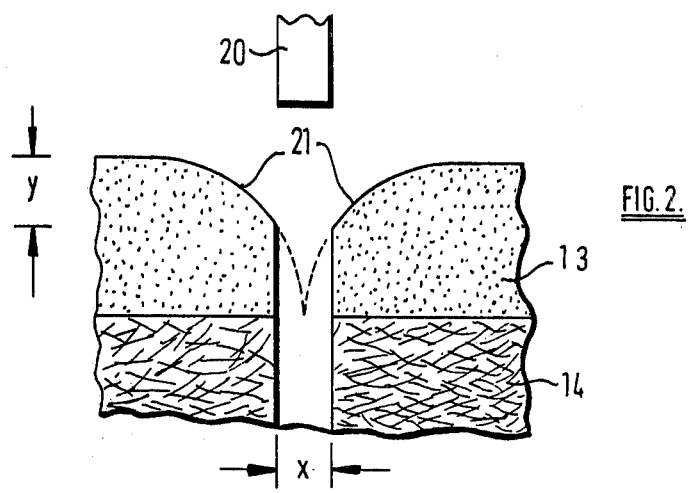
FIG. 2 is an enlarged section of part of the spring assembly of FIG. 1, illustrating the cutting thereof.

Referring now to FIG. 2 of the drawings, this shows the cutting of the assembly into individual springs in more detail. The cutting is carried out by a saw blade 20, which gives a width X of cut. After cutting has been carried out, the individual springs have curved edges 21, extending to a depth Y before the flat sides of the springs are reached. Thus, in addition to the advantage above referred to, it is not necessary to machine the individual springs subsequent to cutting to provide such curved edges, although some degree of cleaning up operation will nevertheless be necessary after cutting.

Figure 3:
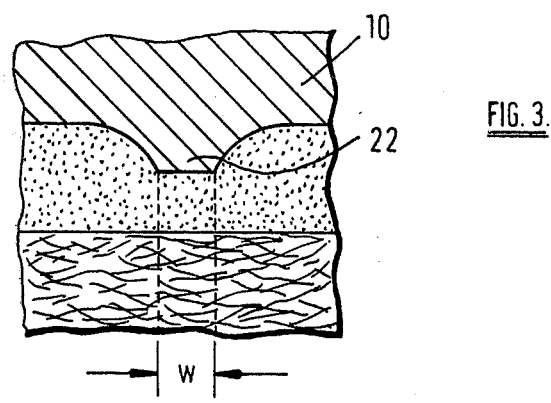
FIG. 3 is a section through part of a modified mould according to the invention.

Referring now to FIG. 3, this shows a mould element 10 having a formation with a flat base portion 22. The width W of the base portion 22 is chosen to be substantially equal to or slightly less than the thickness X of the cut which will be made in forming the individual springs. Thus, a step in the side surfaces of the springs is avoided.

Figure 4:
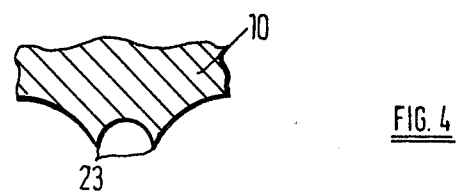
FIG. 4 is a section showing yet a further embodiment of mould.

Referring now to FIG. 4, this shows a mould element 10 with a formation having two crests 23 spaced apart from one another by a distance bearing the same relation to the cut thickness as does the width W. A formation of this form on the mould element involves a minimum displacement of the material of the spring assembly during the moulding process.

I claim:

1. In a method of manufacturing leaf springs from composite, fibre reinforced resin material, the method comprising:
    forming an assembly of resin impregnated fibres of sufficient width to constitute a number of individual springs in side-by-side relationship;
    subjecting the assembly to a moulding process including a treatment to cure the resin and set the fibres therein;
    cutting the cured assembly along at least one plane extending longitudinally of the assembly and between opposed surfaces thereof to form said individual springs;
    the improvement comprising forming, during said moulding process, depressions in said surfaces along said planes where the assembly is to be cut, whereby fibres adjacent said surfaces remain undisturbed by said cutting.

2. A method according to claim 1 in which the cross-sectional shape of each of said depressions includes curved edges.

3. A method according to claim 2 in which the cross-sectional shape of each of said depressions includes a base portion having a width substantially equal to the thickness of a cut to be made in the assembly.

4. A method according to claim 3 in which the base portion is flat.

5. A method according to claim 3 in which the base portion extends outwardly towards the surface of the assembly.

6. In a method of manufacturing leaf springs from composite, fibre reinforced resin material, the method comprising:
    forming an assembly of resin impregnated longitudinal fibres in parallel arrangement with the assembly sufficiently wide to constitute a plurality of individual springs in side-by-side relationship;
    subjecting the assembly to a moulding process including a treatment to cure the resin and set the fibres therein;
    cutting the cured assembly along at least one plane extending longitudinally of the assembly and between opposed surfaces thereof to form said individual springs;
    the improvement comprising using a mould in the moulding process which forms at least one surface depression in said assembly along the line where it is to be cut thereby maintaining the fibres at the surface adjacent the depression in parallel longitudinal arrangement and with formation of the depression restraining lateral displacement of the fibres into the line of cut.

* * * * *